Dec. 14, 1965  J. FALERNI ETAL  3,223,295
METERED FLUID DISPENSER
Filed July 9, 1963
FIG. 1.
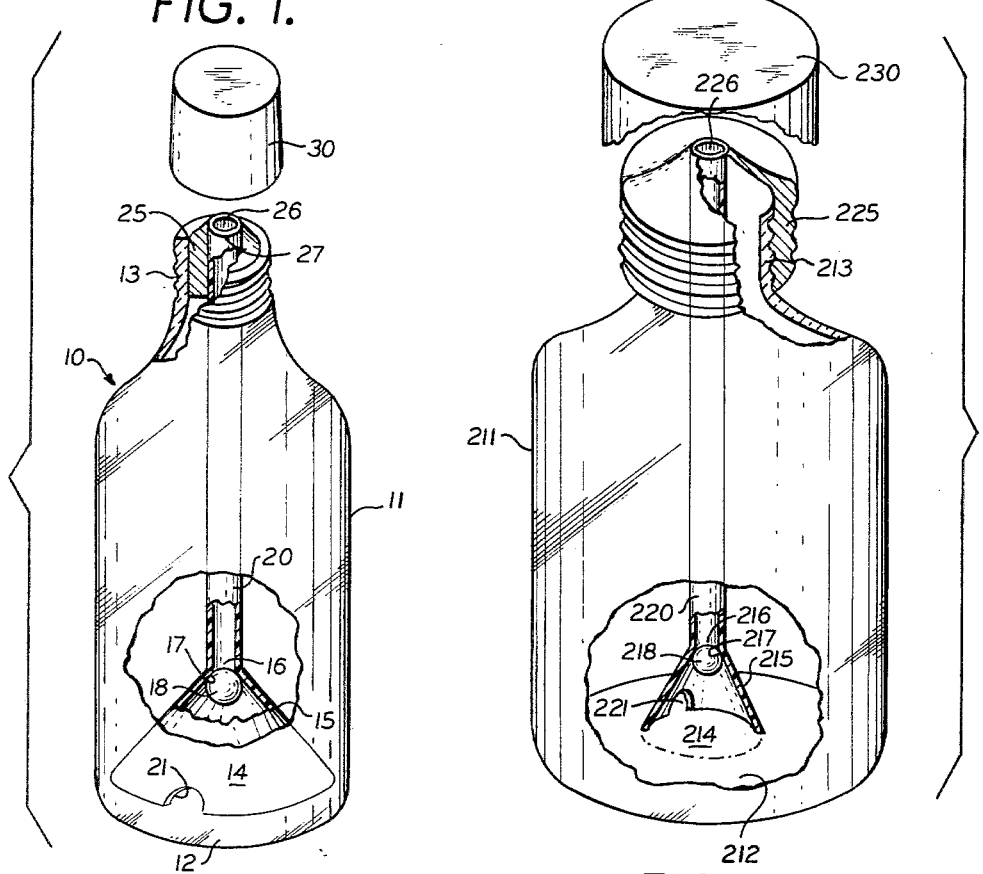
FIG. 2.
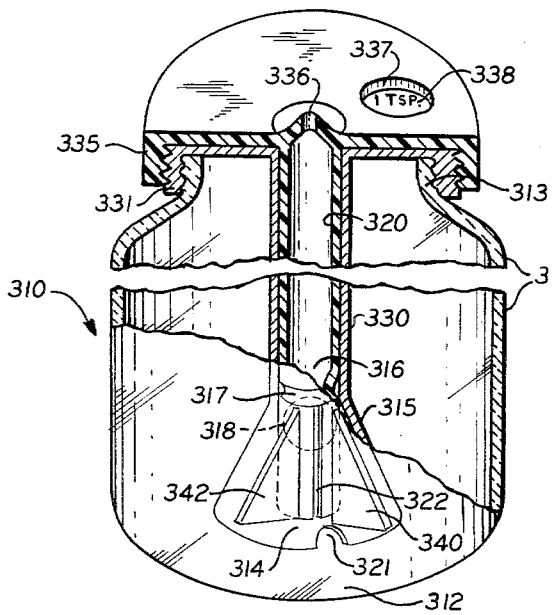
FIG. 3.
INVENTORS
JACK FALERNI
DOROTHY ARBITMAN
BY
ATTORNEY.

United States Patent Office 3,223,295
Patented Dec. 14, 1965

3,223,295
METERED FLUID DISPENSER
Jack Falerni, 2555 Cruger Ave., and Dorothy Arbitman, 2150 Wallace Ave., both of Bronx, N.Y.
Filed July 9, 1963, Ser. No. 293,793
4 Claims. (Cl. 222—438)

This invention relates to the art of fluid dispensing, more particularly to means implementing the delivery of a desired metered quantity of fluids from a container.

A variety of situations exist in which it is desired to pour only a given quantity of fluids from a container for the fluids. Thus in the case of medicines, lotions, flavoring additives, or a myriad other types of fluids normally sold and stored in containers, the user utilizes the fluid a small bit at a time. In attempting to pour a relatively small quantity of the fluid from the neck of a conventional container, relatively great care must be exercised in order to avoid spillage. Even with care, spillage often occurs, resulting in waste of the fluid, and often in damage to the surrounding area. The manipulative steps involved in pouring a precise desired quantity of fluid from a container are further increased by virtue of the fact that a separate measuring inmplement must be employed into which the liquid from the container is poured, and thereafter the measured quantity of liquid in the measuring implement is utilized as desired. In pouring the liquid from the measuring implement, further losses often occur. Other problems arise in that due to the fact that the container must be opened to permit pouring of the fluid therefrom, the contents of the container become subject to contamination, and loss by evaporation.

It is with the above problems and desiderata in mind that the present means, including both method and apparatus, have been evolved, means permitting the dispensing of a desired metered quantity of fluid from a container without necessitating the pouring of the fluid from the container into a separate measuring implement. The novel means here presented additionally maintain the fluid contents of the container in a substantially sealed condition during pouring so as to eliminate losses by contamination, evaporation, or spillage.

It is accordingly among the primary objects of this invention to provide improved means for dispensing a desired metered quantity of fluid from a container.

Another object of the invention is to provide means permitting the dispensing of the desired quantity of fluid from a container without necessitating the opening of the container to expose the fluid contents thereof.

A further object of the invention is to provide an improved metering dispenser which may be readily adapted for use with most conventional liquid containers.

It is also an object of the invention to provide an improved metering dispenser which may selectively be adapted for the dispensing of any preselected quantity of fluid.

A further object of the invention is to provide an improved metering dispensing structure of simple construction, subject to efficient economical assembly.

These and other objects of the invention which will become hereafter more apparent are achieved by provision of a dispensing assembly which when conjoined with a fluid container provides a novel fluid dispenser. The novel dispensing assembly comprises a metering chamber confining a volume accommodating the quantity of fluid desired to be dispensed. This chamber is formed with valve guiding means in the form of an inclined top surface, preferably of a conical configuration. At the top of the incline an exit port from the metering chamber is provided which is coupled to a discharge conduit leading to a pouring orifice formed in a closure cap for the container. Thus any fluid received within the metering chamber may be poured through the pouring orifice via the discharge conduit, as will be made hereinafter more apparent. A valve member is arranged within the metering chamber and is formed so as to displace a volume of fluid greater in weight than the weight of the valve member whereby the valve member will float in the fluid in the chamber. The valve member in floating on the surface of the fluid within the chamber rises against the guide surface of the chamber to a valve seat arranged adjacent the discharge port of the chamber so that when the chamber is filled with the desired quantity of fluid the discharge port will be sealed and further admission of fluid will be prevented, since further flow of fluid to the chamber is blocked. Admission of fluid to the chamber is at a lower extremity thereof in communication with the fluid in the container. In use the container is maintained in its normal vertical storage position at which time the fluid from the container will flow through the entry port of the chamber into the chamber to fill same to a height limited by the flotation of the valve to its valve seat. Thereafter inversion of the container will cause the valve to be displaced from the valve seat and permit the flow of fluid from the chamber through to the discharge orifice of the closure cap.

According to another embodiment of the invention, the metering chamber is formed with a movable wall mounted on a tube extending through the discharge conduit. The wall supporting tube is coupled to an adjusting cap on the closure cap, and this adjusting cap is movable to any preselected position to adjust the volume of the metering chamber.

An important feature of the invention resides in the fact that the novel dispensing assembly lends itself to ready transfer between different types of containers, the only requirement being that the necks of the containers, as is conventionally the case, be of the same diameter so as to accommodate the same screw cap.

The specific details of a preferred embodiment of the invention and their mode of functioning will be made most manifest and particularly pointed out in clear, concise and exact terms in conjunction with the accompanying drawings wherein:

FIG. 1 is a perspective view of a container provided with a novel dispensing assembly, with parts broken away, and a closure cap exploded away from the container, the illustrated container being transparent so as to reveal the component parts of the dispensing assembly;

FIG. 2 is a perspective view similar to FIG. 1 showing how the novel dispensing assembly may be utilized in connection with a container so that the assembly may be removed from the container and reinserted in a container of like neck diameter; and FIG. 3 is a perspective view of another embodiment of the novel dispenser with parts broken away and shown in cross-section indicating how the metering chamber may be formed with a selectively adjustable volume.

Referring now more particularly to the drawings, like numerals in the various figures will be employed to designate like parts.

As seen in FIG. 1, the fluid dispenser 10 comprises a fluid container 11 here shown as of a right circular cylindrical configuration in the shape of a conventional glass bottle, or plastic container. Container 11 is formed with a circular base 12 and a conventionally threaded neck 13.

Within the container 11, the dispensing assembly is arranged. The dispensing assembly includes a metering chamber 14, preferably formed of plastic or the like readily molded material. Chamber 14 has a conical top surface 15 terminating at exit port 16 at its truncated apex. It will be observed that the interior walls of the conical chamber 14 are inclined parallel to the top surface thereof and provide guide surfaces for a valve member 18, here shown in the shape of a ball. Valve member 18 is of a volumetric dimension so as to displace a quantity of the fluid to be dispensed greater in weight than the weight of the ball, so that the valve member 18 will float within the fluid. The valve member in FIG. 1 is shown seated on valve seat 17 formed at the base of a tubular discharge conduit 20 which is conjoined with the chamber 14 at the apex thereof so that any fluid within the chamber 14 may be discharged through conduit 20 by inverting the container 11, as will be made hereinafter more apparent. Chamber 14 is formed with an inlet port 21 in fluid communication with contents of container 11 so that fluid from the container will flow into the chamber 14 through port 21 when the container is in the orientation illustrated in FIG. 1. The base of chamber 14 is rested on the interior of base 12 of container 11 as illustrated. It will be understood by those skilled in the art that fluid may pass into the chamber 14 around the open base thereof. In the form of the invention illustrated in FIG. 1, the end of discharge conduit 20 remote from chamber 15 passes through closure 25, here shown in the form of a plug adapted for insertion within the neck of container 11. Plug 25 is formed with a discharge orifice 26 having a pouring lip 27 to implement the discharge of fluid. Cap member 30 of a conventional internally threaded type is provided to close off the container 11 for shipment and storage.

In the embodiment of the invention illustrated in FIG. 2, the same numerals will be employed to designate the components of the dispenser as were employed in conjunction with the FIG. 1 embodiment of the invention, save for the fact that the numeral 2 will be prefaced to the numerals employed in FIG. 1, thus component 11 will be referred to as component 211 in the FIG. 2 embodiment.

In this embodiment of the invention, the dispensing assembly is shown as af a size permitting ready insertion through the neck 213 of the container 211. The dispensing assembly as aforedescribed comprises a metering chamber 214 having a maximum diameter slightly less than that of the interior diameter of the neck 213 of the container. Chamber 214 is formed with an upwardly inclined top surface 215. The base of chamber 214 rests on the interior of base 212 of container 211 as illustrated. Metering chamber 214 is formed with an exit port 216 which defines a valve seat 217 for valve 218. Valve 218 shown as a ball is of a volumetric dimension such as to displace a quantity of fluid serving to float the valve member 218 on the surface of the fluid, as previously described. Discharge conduit 220 is joined in fluid tight relationship to exit port 216 of chamber 215, and at its opposite end is connected to container closure 225 which in this embodiment of the invention is shown as comprising an internally and externally threaded cap member, with the internal threads of the cap member engaging the conventional externally threaded neck 213 of container 211. A pouring orifice 226 is formed at the top of the closure member 225. Conventional internally threaded bottle cap 230 is provided to engage the external threads on closure cap 225 as illustrated.

Discharge conduit 220 may be formed of a telescoping tube to facilitate use of the dispensing assembly in containers of different height.

In the embodiment of the invention illustrated in FIG. 3, the numerals employed for designating the components of the dispenser like those in the FIG. 1 embodiment will be prefaced by the numeral 3 so that a component like container 11 will be identified as container 311 in connection with this description of the embodiment illustrated in FIG. 3.

The dispenser 310 includes a container 311 having a base 312 and an externally threaded neck 313. Container 311 is of a conventional type such as are conventionally fabricated of glass or plastic. The dispensing assembly as illustrated is intended for insertion through the neck 313 of the container thus permitting ready assembly of the dispenser, and further permitting utilization of the dispensing assembly in connection with a variety of different types of containers. The dispensing assembly is formed with a dispensing chamber 314 resting on base 312 of container 311.

Chamber 314 has conical top walls 315. Chamber exit port 316 having valve seat 317 upon which valve member 318 may be seated is formed in discharge conduit 320. Inlet port 321 permits fluid flow from the container 311 into chamber 314. A slot 322 is formed in the portion of conduit 320 extending down into the chamber 314, and valve member 318 is held within the slotted portion of conduit 320. The fluid admitted to chamber 314 through inlet port 321 fills the slotted portion of conduit 320 within chamber 314. Valve seat 317 is formed as a constriction in conduit 320 above slot 322.

Discharge conduit 320 is rotatably slideable within chamber 314 and chamber support 330 illustratively shown as a tube coupled at one end in fluid tight relationship to the top of chamber 314 and at its other end to a cap member 331. Cap member 331 is internally threaded to engage the threads on the neck 313 of container 311, and externally threaded to engage internally threaded adjusting cap 335.

Adjusting cap 335 is secured in fluid tight relationship to the top of discharge conduit 320. The adjusting cap is preferably formed integral with conduit 320 and is formed with a pouring orifice 336 and an indicia window 337. The top surface of cap member 331 is provided with indicia 338 lying along the circumference of a circle aligned with the indicia window 337 for a purpose to be made hereafter more apparent.

Secured to an interior wall of chamber 314 is a fixed baffle wall 340 arranged in proximity to inlet port 321 and chamber exit port 316. As noted from the drawings these ports are substantially aligned with respect to a vertical plane extending through the conduit 320 and chamber 314.

A movable chamber baffle wall 342 is secured to the rotatable discharge conduit 320, for rotation therewith. As is apparent from the drawings the dimensions of chamber baffle walls 340 and 342 are such as to extend between the interior of the top wall of chamber 314 and the interior of container bottom 312 so that the volume of fluid admitted to chamber 314 via inlet port 321 and available for discharge through exit port 316 is defined by the space between the chamber baffle walls.

*Operation*

In use, the aforedescribed dispensing assembly in either the forms shown in FIGS. 1, 2 or 3 is first arranged within a container from which given desired metered quantities of fluid are to be dispensed.

Though obviously of a less flexible nature in that the dispensing assembly must be positioned within the container forming mold during container formation, the embodiment of the invention illustrated in FIG. 1 is employed by removing container closure plug 25 from the neck 13 of container 11 and filling the container with the fluid to be dispensed. The plug 25 is then reinserted to close the fluid within the container. With the container oriented as illustrated in the conventional bottom down storage position, valve 18 will be floated in the fluid against the upwardly inclined conical top walls 15 which act as valve guides to constrain the valve to move to a position in valve seat 17 closing off exit port 16 of chamber 14. When the exit port is closed, no further fluid can flow into chamber 14 since there is no way of relieving the air pressure in the chamber.

Thereafter when it is desired to dispense a metered quantity of the fluid as confined or chambered by the chamber 14, the container 11 is tipped to a position such that the bottom of chamber 14 (which is approximately coincident with bottom of the interior of container 11) is raised so that the bottom is above the highest point of the fluid in the tipped container. As a desired degree of tipping, it is preferred to invert the bottle through 180°.

In this tipped condition the floating valve 18 will be displaced from its valve seat 17 since the valve will rise to the highest point of the liquid in the chamber 14 which is now above the valve seat. The level of fluid in the container 11 will be below the normally bottom part of chamber 14 so that no fluid flow takes place between the container and the chamber. However the fluid in the chamber 14 may now flow through discharge conduit 20 to pouring orifice 26.

A similar mode of operation is employed in connection with the embodiment of the invention illustrated in FIG. 2 except for the fact that the metering chamber 214 is dimensioned to permit insertion of the dispensing assembly through the neck of the container. Discharge conduit 220 is made of a length so that chamber 214 is adjacent the bottom of container 211. The container closure is formed by cap 225 engaging the threads of the container neck 213, and sealing of the container for storage is effected by means of internally threaded cap 230.

In use of the embodiment of the invention illustrated in FIG. 3, the metering chamebr 314 is dimensioned, as was the chamber of the FIG. 2 embodiment to permit insertion of the dispensing assembly through the neck 313 of container 311, and chamber support 330 and discharge conduit 320 are selected of a length such that the inlet port 321 and open bottom of chamber 314 are adjacent the bottom of container 311 as illustrated. A telescoping construction for the support 330 and conduit 320 will facilitate use of the same dispensing assembly in containers of different height.

Cap member 331 is formed with a greater number of internal threads than external threads so that once the dispensing assembly is secured to a container by means of cap member 331 the rotation of adjusting cap 335 on cap member 331 will not cause rotation of cap member 331.

With the container in the illustrated neck side up orientation, adjusting cap member 335 is rotated to expose an indicia through window 337 indicative of the quantity of fluid desired to be dispensed. As cap member 331 is rotated to this position, movable chamber baffle wall 342 affixed on conduit 320, which is formed integral with cap member 331, moves to a position in chamber 314 relative to fixed chamber baffle wall 340 confining a volume equal to (or slightly larger than, to allow for fluid losses due to surface adhesion or the like) that indicated through window 337.

With fluid in container 311, the fluid flows through chamber inlet port 321 between chamber baffle walls 340 and 342 and valve 318 floats upwardly guided by valve guide surfaces formed by the lower slotted part of conduit 320 to seat on valve seat 317 closing exit port 316. Thereafter tipping of the container permits dispensing of the fluid from the confined or chambered space between the baffle walls in the fashion above described in connection with FIG. 1.

It is thus sen that a simple dispensing assembly has been provided implementing the discharge of a desired metered quantity of fluid from a container with the contents of the container not subject to spillage or contamination as a result of the metering action.

The above disclosure has been given by way of illustration and elucidation, and not by way of limitation, and it is desired to protect all embodiments of the herein disclosed inventive concept within the scope of the appended claims.

What is claimed is:

1. A fluid dispensing assembly for dispensing a desired metered quantity of fluid from a container said dispensing assembly comprising: a metering chamber in fluid communication with the fluid in said container, said chamber having an outlet above the bottom of the chamber and an inlet formed between the bottom of the chamber and a lowermost part of the container; a valve seat adjacent said outlet; a fixed baffle wall and a movable baffle wall in said chamber on opposite sides of said outlet; a valve member of a density such as to float in the fluid arranged within said chamber; a guide surface on said chamber guiding said valve member into said seat to close off said outlet when a given quantity of fluid has been admitted to said chamber from said container; a discharge conduit leading from the chamber outlet and a pouring orifice on the container in fluid communication with said chamber to permit the dispensing of the fluid metered in said chamber.

2. A fluid dispensing assembly as in claim 1 in which said metering chamber is of a dimension permitting its insertion into the neck of a container from which the fluid is to be dispensed.

3. A metered quantity fluid dispenser comprising a container for the fluid, said container having side walls integral with a relatively flat bottom wall forming a fluid tight enclosure therebetween with an opening at the end of the container opposite the bottom wall; a metering chamber within said container said metering chamber having walls formed with an interior surface extending along an incline from an open base portion to a outlet port relatively small as compared to the base portion of the chamber, the base portion of the chamber lying on the bottom wall of said container, said chamber having an inlet port formed in the chamber wall immediately adjacent the chamber base portion permitting the free flow of fluid from the container into the chamber when the container is positioned bottom wall down; a discharge conduit extending from the outlet port of said chamber through the container to the container opening; a fixed baffle wall and a movable baffle wall on opposite sides of the chamber outlet port; and a valve member of a density such as to float in the fluid to be metered dimensioned to close off the chamber exit port when the chamber is filled with fluid and the container is maintained with its bottom wall down.

4. A fluid dispenser as in claim 3 in which said discharge conduit is secured to said movable baffle wall; and a cap member is secured to the upper end of said conduit to permit manual rotation thereof.

References Cited by the Examiner
UNITED STATES PATENTS

| | | | |
|---|---|---|---|
| 860,170 | 7/1907 | Weineis | 222—456 |
| 1,877,808 | 9/1932 | Cagliostro | 222—456 |
| 2,704,623 | 3/1955 | Yasso | 222—456 |
| 2,943,767 | 7/1960 | Moro-Lin | 222—425 X |

LOUIS J. DEMBO, *Primary Examiner.*